(No Model.)

A. L. GATES.
CLOVER HULLING ATTACHMENT FOR THRASHING MACHINES.

No. 298,196. Patented May 6, 1884.

Attest:
Wm R Duvall
D. J. Bornhard

Inventor:
A. L. Gates
per Edson Bros.
Attorneys

UNITED STATES PATENT OFFICE.

ALFRED L. GATES, OF SURREY, WISCONSIN.

CLOVER-HULLING ATTACHMENT FOR THRASHING-MACHINES.

SPECIFICATION forming part of Letters Patent No. 298,196, dated May 6, 1884.

Application filed December 28, 1883. (No model.)

*To all whom it may concern:*

Be it known that I, ALFRED L. GATES, a citizen of the United States, residing at Surrey, in the county of Portage and State of Wisconsin, have invented certain new and useful Improvements in Clover-Hulling Attachments for Thrashing-Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to clover-hulling attachments for thrashing-machines, and has for its object the provision of means whereby an ordinary thrashing-machine may be quickly converted into a clover hulling and thrashing machine.

My invention contemplates, first, the provision of a solid plano-concave provided with teeth, so constructed and arranged as not only to be quickly and easily removed from such concave, but also to thoroughly fulfill their appointed task—*i. e.*, the proper hulling and thrashing of clover; secondly, the provision of a tooth so constructed and arranged as to present in itself a second concave of metal to the action of the teeth upon the thrashing-cylinder, and at the same time capable of being easily and quickly removed from the plano-concave proper; thirdly, securing the teeth to the concave proper in such a manner that said teeth are firmly held against displacement by lateral strains.

To the accomplishment of the above my invention consists in the construction, arrangement, and combination of parts, substantially in the manner hereinafter set forth and claimed.

Like letters of reference in the several drawings denote like parts.

Figure 1:
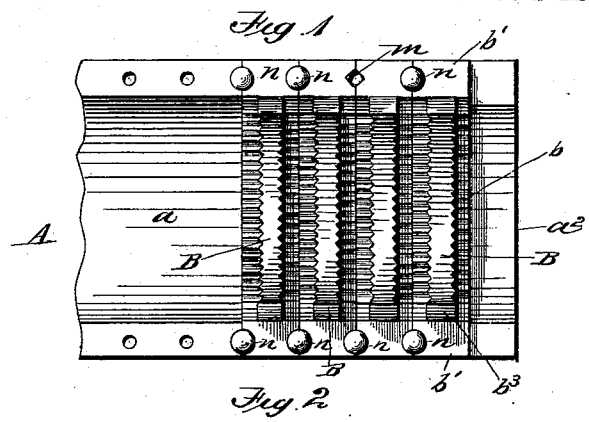
Figure 2:
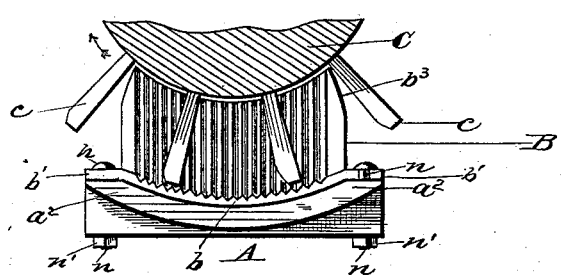
Figure 3:
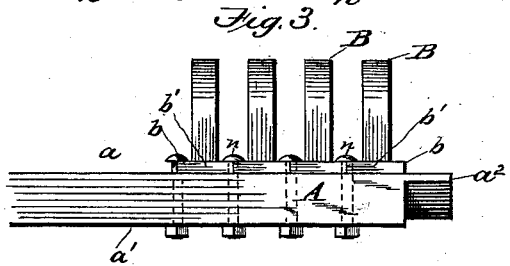
Figure 4:
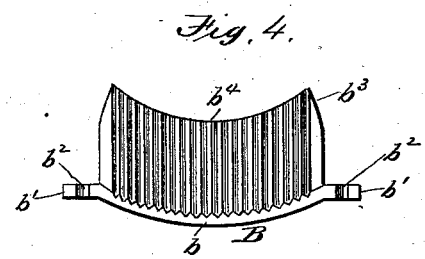
Figure 5:
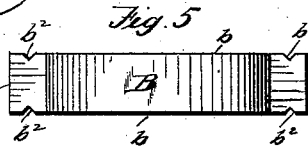

Figure 1 represents a portion of the concave proper provided with my improved clover-hulling teeth. Fig. 2 represents an end view thereof in connection with the cylinder of a thrashing-machine. Fig. 3 is an edge view of Fig. 1. Fig. 4 represents a side elevation of my improved clover-hulling tooth detached from the concave proper. Fig. 5 is a bottom plan view thereof, and Fig. 6 is an end view of the solid plano-concave.

Figure 6:
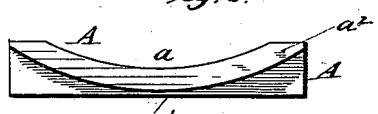

Referring to the drawings, A represents a solid plano-concave, preferably formed of wood, the upper surface, $a$, of which is, as its name implies, concave, while its lower surface, $a'$, is flat, as shown in Figs. 3 and 6.

$a$ represents tenons formed on the ends of the concave A for the purpose of securing it to the concave-rests at each side of the machine.

B represents the teeth, each separate from its fellow, and provided upon its sides and ends, at the bottom thereof, with flanges $b$ $b'$. The lower surface of the tooth and flanges $b$ is concentric with the upper surface, $a$, of the plano-concave A, while the end flanges, $b'$, are in a horizontal plane surface, $a'$, of the concave A, each of said end flanges, $b'$, being provided at its sides with V-shaped indents $b^2$. Each tooth B extends from the front to the concave edges of the surface $a$—that is to say, in a plane at right angles to the longitudinal axis of the cylinder C, and each of said teeth is provided with corrugated or roughened sides, whereby the clover is properly hulled when the machine is in operation. The upper surface of the side flanges, $b$, are also corrugated or roughened. The upper surface, $b^4$, of each tooth B is concentric with the cylinder C, and also with the upper surface, $a$, of the concave A, and said edges of the teeth B are adjusted closely to the cylinder, the teeth $c$ of the cylinder passing between the teeth B of the concave. The front and rear edges of the teeth B are parallel with each other, and are slightly rounded at their upper ends, (see $b^3$.) The side flanges, $b$, of the teeth B bear against each other when said teeth are in position, (see Fig. 1,) and secured to the concave A by bolts $n$, that pass downward through square apertures $m$, formed by the V-shaped indents $b^2$, and through apertures in the concave A. The heads of the bolts $n$, as shown in Figs. 2 and 3, bear upon the surfaces of two adjacent teeth, thus affording great support and firmness to the teeth, and lessening their liability to be displaced. I preferably make the teeth of chilled iron, as I have found by experience that great hardness of the metal composing the teeth is desirable, and as from their form and construction no occasion exists for the use of drills or other tools to fit them for use, it will be seen that any degree of hardness may be given to the teeth while they are being cast.

I have found by experience that in order to properly hull clover it is necessary that the clover-head pass between the teeth of the concave and as near the upper surface thereof as possible, and that such proper hulling of the clover-head cannot be successfully accomplished in machines provided with the ordinary spike-formed tooth, or teeth extending from front to rear of the concave, and having beveled front or upper edges, from the fact that the clover-heads, when hulled by the machines last above referred to, are forced upward by cylinder-teeth and ride upon the teeth, or are massed by such upward movement and pass between the teeth of the concave without being properly hulled. To obviate this most serious objection, I have made the front and rear edges of my teeth-sections vertical, so that when the cylinder-teeth come in contact with the clover lying in front of such teeth-sections the angle formed by and between the cylinder-teeth and concave-teeth operate to press the clover downward toward the base of the teeth, the roughened sides of said teeth thereby insuring proper hulling of the clover-heads while passing between the concave-teeth.

I am aware that teeth-sections extending from front to rear end of concave have been heretofore employed; but I am not aware that teeth constructed as herein described, having vertical front and rear edges for the purpose of obviating the objections above set forth, have ever been in use.

From the above description it will be seen that the concave A may be quickly removed from the concave-rests at the side of the machine, and a concave provided with the ordinary thrashing-teeth substituted therefor.

I claim—

1. In a clover-hulling attachment for thrashing-machines, the combination, with the thrashing-cylinder, of the plano-concave provided with teeth-sections, constructed as described, extending from front to rear of the concave, and having vertical front and rear edges and top and bottom edges concentric with the thrashing-cylinder, substantially as herein described.

2. In a clover-hulling attachment for thrashing-machines, the combination, with the thrashing-cylinder, of the plano-concave provided with teeth-sections having their top edges concentric with the cylinder, said sections extending from front to rear of the concave, and having vertical front and rear edges, and provided at their base with laterally-projecting flanges having indentations and fastening-bolts, substantially as described.

3. In a clover-hulling attachment for thrashing-machines, the combination of the plano-concave provided with teeth-sections having vertical front and rear edges, and provided at their base with laterally-extending side flanges that abut together, said flanges provided at their side edges with V-shaped indentations and fastening-bolts, the heads of each of said bolts bearing upon two adjacent sections, substantially as described, with the thrashing-cylinder, as and for the purpose set forth.

In testimony whereof I affix my signature in presence of two witnesses.

ALFRED L. GATES.

Witnesses:
O. H. LAMOREUX,
LYMAN J. SMITH.